United States Patent
Wang et al.

(10) Patent No.: US 11,586,972 B2
(45) Date of Patent: Feb. 21, 2023

(54) TOOL-SPECIFIC ALERTING RULES BASED ON ABNORMAL AND NORMAL PATTERNS OBTAINED FROM HISTORY LOGS

(71) Applicant: INTERNATIONAL BUSINESS MACHINES CORPORATION, Armonk, NY (US)

(72) Inventors: Yuan Wang, Beijing (CN); Lin Yang, Beijing (CN); Xiao Xi Liu, Beijing (CN); Fan Jing Meng, Beijing (CN); Jing Min Xu, Beijing (CN); William V. Da Palma, Coconut Creek, FL (US); Sandhya Kapoor, Austin, TX (US); Takayuki Kushida, Tokyo (JP); Hiroki Nakano, Shiga (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1117 days.

(21) Appl. No.: 16/195,070

(22) Filed: Nov. 19, 2018

(65) Prior Publication Data
US 2020/0160230 A1    May 21, 2020

(51) Int. Cl.
*G06N 20/00*    (2019.01)
*G06N 5/00*    (2023.01)
*G06F 16/2458*    (2019.01)

(52) U.S. Cl.
CPC ......... *G06N 20/00* (2019.01); *G06F 16/2465* (2019.01); *G06N 5/003* (2013.01); *G06F 2216/03* (2013.01)

(58) Field of Classification Search
CPC .... G06N 20/00; G06N 5/003; G06F 16/2465; G06F 2216/03; H04L 43/00
See application file for complete search history.

(56) References Cited

U.S. PATENT DOCUMENTS

| 9,734,005 B2 | 8/2017 | Ruan et al. |
| 2008/0162397 A1* | 7/2008 | Zaltzman ............... H04L 43/00 706/48 |

(Continued)

OTHER PUBLICATIONS

Gomez et al., "A Pareto-based multi-objective evolutionary algorithm for automatic rule generation in network intrusion detection systems", Soft Computing. vol. 17. No. 2. Feb. 1, 2013. pp. 255-263.

(Continued)

*Primary Examiner* — Joseph L Greene
(74) *Attorney, Agent, or Firm* — Tutunjian & Bitetto, P.C.; Joseph Petrokaitis

(57) ABSTRACT

A computer-implemented method is presented for automatically generating alerting rules. The method includes identifying, via offline analytics, abnormal patterns and normal patterns from history logs based on machine learning, statistical analysis and deep learning, the history logs stored in a history log database, automatically generating the alerting rules based on the identified abnormal and normal patterns, and transmitting the alerting rules to an alerting engine for evaluation. The method further includes receiving a plurality of online log messages from a plurality of computing devices connected to a network, augmenting the plurality of online log messages, and extracting information from the plurality of augmented online log messages to be provided to the alerting engine, the alerting engine configured to approve and enforce the alerting rules automatically generated by the offline analytics processing.

20 Claims, 8 Drawing Sheets

(56) References Cited

U.S. PATENT DOCUMENTS

| | | | |
|---|---|---|---|
| 2011/0296244 A1 | 12/2011 | Fu et al. | |
| 2012/0078913 A1* | 3/2012 | Muni | G06F 16/211 |
| | | | 707/769 |
| 2016/0253415 A1 | 9/2016 | Zhong et al. | |
| 2016/0301561 A1 | 10/2016 | Petersen et al. | |
| 2017/0109667 A1* | 4/2017 | Marcu | G06F 9/4843 |
| 2017/0178026 A1 | 6/2017 | Thomas et al. | |
| 2018/0032905 A1 | 2/2018 | Abercrombie | |
| 2018/0102938 A1 | 4/2018 | Yoon et al. | |
| 2019/0318203 A1* | 10/2019 | Jou | G06F 21/566 |
| 2019/0379589 A1* | 12/2019 | Ryan | G06N 3/0454 |
| 2020/0067861 A1* | 2/2020 | Leddy | G06Q 30/0185 |
| 2020/0118366 A1* | 4/2020 | Ryan | G05B 23/0232 |
| 2020/0134046 A1* | 4/2020 | Natanzon | H03M 7/607 |

OTHER PUBLICATIONS

Kimura et al., "Proactive Failure Detection Learning Generation Patterns of Large-scale Network Logs", 2015 11th International Conference on Network and Service Management. Nov. 9-13, 2015. pp. 1-7.

\* cited by examiner

TOOL-SPECIFIC ALERTING RULES BASED ON ABNORMAL AND NORMAL PATTERNS OBTAINED FROM HISTORY LOGS

BACKGROUND

Technical Field

The present invention relates generally to information services, and more specifically, to tool-specific alerting rules based on abnormal and normal patterns obtained from history logs.

Description of the Related Art

Fast growth of the cloud platform's scale and complexity calls for more sophisticated operation management. Problem diagnosis is one pertinent aspect in the domain of cloud operation management. However, operational log analysis for problem diagnosis is becoming more challenging. First, the volume of logs generated on a daily basis is overwhelmingly large. Second, with the increasing number of service components, the cross-component interactions of a cloud platform become more complex. Third, unstructured textual log messages make the analysis much harder with typical statistical or machine learning techniques.

SUMMARY

In accordance with an embodiment, a method is provided for automatically generating alerting rules. The method includes identifying, via offline analytics, abnormal patterns and normal patterns from history logs based on machine learning, statistical analysis and deep learning, the history logs stored in a history log database, automatically generating the alerting rules based on the identified abnormal and normal patterns, transmitting the alerting rules to an alerting engine for evaluation, receiving a plurality of online log messages from a plurality of computing devices connected to a network, augmenting the plurality of online log messages, and extracting information from the plurality of augmented online log messages to be provided to the alerting engine, the alerting engine configured to approve and enforce the alerting rules automatically generated by the offline analytics processing.

In accordance with another embodiment, a system is provided for automatically generating alerting rules. The system includes a memory and one or more processors in communication with the memory configured to identify via offline analytics, abnormal patterns and normal patterns from history logs based on machine learning, statistical analysis and deep learning, the history logs stored in a history log database, automatically generate the alerting rules based on the identified abnormal and normal patterns, transmit the alerting rules to an alerting engine for evaluation, receive a plurality of online log messages from a plurality of computing devices connected to a network, augment the plurality of online log messages, and extract information from the plurality of augmented online log messages to be provided to the alerting engine, the alerting engine configured to approve and enforce the alerting rules automatically generated by the offline analytics processing.

In accordance with yet another embodiment, a non-transitory computer-readable storage medium comprising a computer-readable program for automatically generating alerting rules is presented. The non-transitory computer-readable storage medium performs the steps of identifying, via offline analytics, abnormal patterns and normal patterns from history logs based on machine learning, statistical analysis and deep learning, the history logs stored in a history log database, automatically generating the alerting rules based on the identified abnormal and normal patterns, transmitting the alerting rules to an alerting engine for evaluation, receiving a plurality of online log messages from a plurality of computing devices connected to a network, augmenting the plurality of online log messages, and extracting information from the plurality of augmented online log messages to be provided to the alerting engine, the alerting engine configured to approve and enforce the alerting rules automatically generated by the offline analytics processing.

It should be noted that the exemplary embodiments are described with reference to different subject-matters. In particular, some embodiments are described with reference to method type claims whereas other embodiments have been described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be described within this document.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The invention will provide details in the following description of preferred embodiments with reference to the following figures wherein.

Throughout the drawings, same or similar reference numerals represent the same or similar elements.

DETAILED DESCRIPTION

Embodiments in accordance with the present invention provide methods and devices for generating log alerting rule candidates automatically by analyzing history logs. A computing system can maintain a log which documents events and other activities occurring within the computing system. The log can be stored, for example, in a file, database, or some other repository. Each entry in the log can include a description of an event being logged, and a timestamp indicating the occurrence of the event. The entries in the log can correspond to transactions occurring within the computing system, error conditions, or other types of events. Identification of anomaly events in logs can be inadequately performed. Accordingly, the exemplary embodiments of the present invention introduce a cognitive based method to generate log alerting rule candidates automatically by analyzing the history logs. The exemplary method includes offline analytic steps to find the abnormal and normal patterns from history logs based on machine learning, statistical analysis and deep learning and steps to generate the alerting rules based on at least two principles, that is, if a normal pattern is found in a history log to be broken or an abnormal pattern is found, an alert can be triggered. The exemplary method also includes online log augment steps to extract valuable information from the log messages. This information can be employed by an alerting engine to enforce the alerting rules generated by the offline steps.

It is to be understood that the present invention will be described in terms of a given illustrative architecture; however, other architectures, structures, substrate materials and process features and steps/blocks can be varied within the scope of the present invention. It should be noted that certain features cannot be shown in all figures for the sake of clarity. This is not intended to be interpreted as a limitation of any particular embodiment, or illustration, or scope of the claims.

Figure 1:
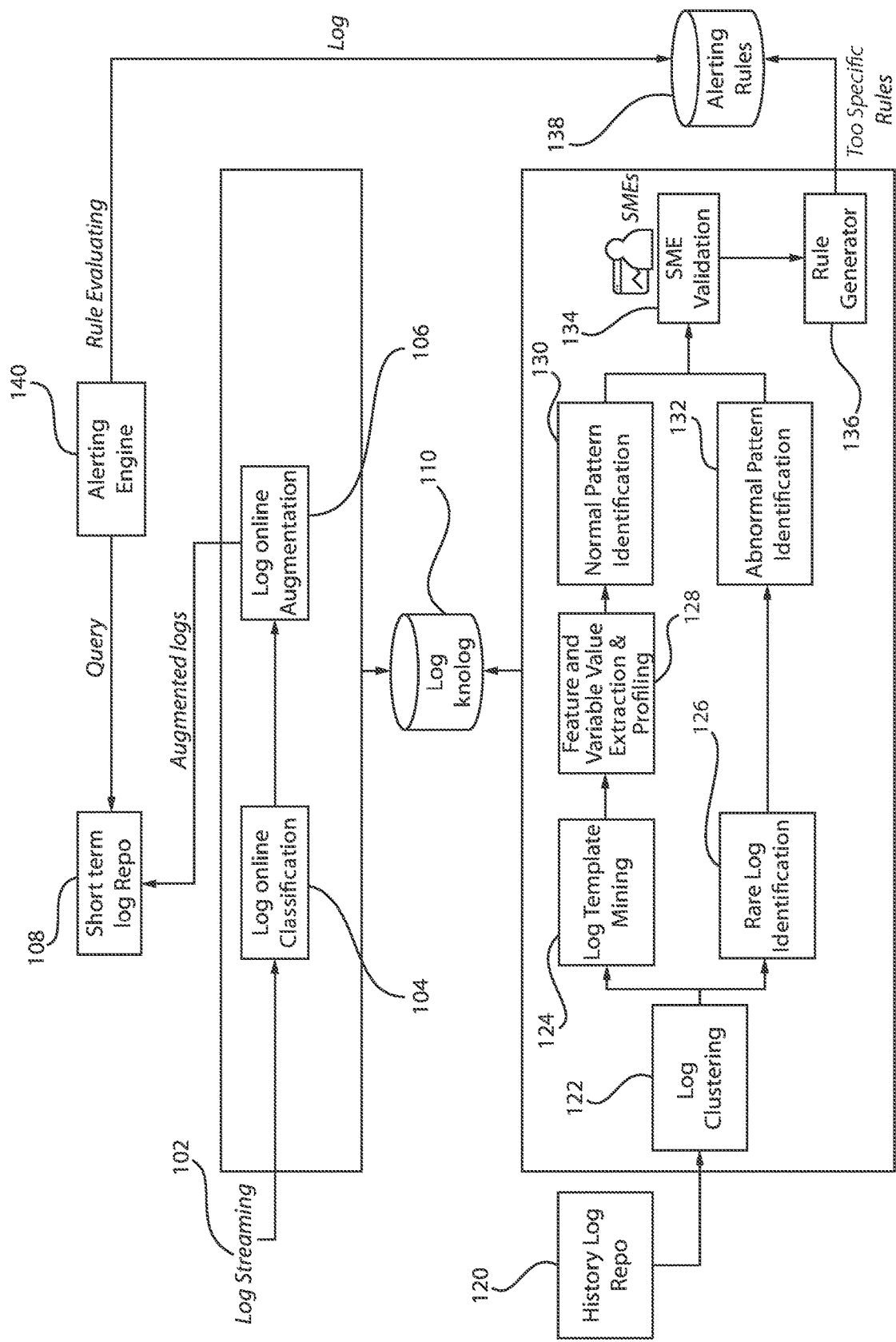
FIG. 1 is an exemplary system architecture for generating tool-specific alerting rules based on abnormal and normal patterns from history logs, in accordance with embodiments of the present invention.

FIG. 1 is an exemplary system architecture for generating tool-specific alerting rules based on abnormal and normal patterns from history logs, in accordance with embodiments of the present invention.

Before delving into the system architecture of FIG. 1, introductory log information is provided for a more complete understanding of the system architecture.

A log is data that is produced automatically by the system and the log stores the information about the events that are taking place inside the operating system. The log stores the data at every period. The log data can be presented in the form of a pivot table or a file. In a log file or table, the records are arranged according to time. Every software application and system produces log files. Logs are usually application specific. Therefore, log analysis a task needed to extract the valuable information from the log file.

Because the volume of data is increasing day by day, there is a great need to extract useful information from large data that are further employed for making decisions. Knowledge discovery and data mining can be employed to efficiently extract useful information from log data. Data mining involves the extraction of patterns and fitting of the model. The concept behind the fitting of the model is to ensure what type of information is inferred from the processing of the model. Data mining works on three aspects, that is, model representation, model estimation, and search. Some of the common data mining techniques are classification, regression, and clustering.

After performing analysis of the logs, the next step is to perform log mining. Log mining is a technique that uses data mining for the analysis of logs. With the introduction of data mining techniques for log analysis, the quality of analysis of log data increases. In this way, analytics approach moves towards software and automated analytic systems.

The process of log mining includes three phases. Firstly, the log data is collected from various sources like Syslog, Message log, etc. After receiving the log data, the log data is aggregated together using, e.g., a log collector. After aggregation, the second phase is started. In this phase, data cleaning is performed by removing the irrelevant data or corrupted data that can affect the accuracy of the process. After cleaning, log data can be represented in structured form of data (integrated form) so that queries could be executed on them.

Thereafter, the transformation process is performed to convert the log data into the desired format for performing normalization and pattern analysis. Useful patterns are obtained by performing pattern analysis. Various data mining techniques are used such as association rules, clustering, etc. to grasp the relevant information from the patterns. This information is used for decision-making and for alerting the unusual behavior of the design by the organization. The unusual behavior can be classified as an anomaly or anomalies or outliers.

An anomaly is defined as the unusual behavior or pattern of the data. An anomaly indicates the presence of the error in the system. An anomaly describes that the actual result is different from the obtained result. Thus, the applied model does not fit into the given assumptions. As a result, the system produces logs which include information about the state of the system. By analyzing the log data anomalies, the security of the system could be protected. This can be performed by using data mining techniques.

There are at least three different types of anomalies:

Point Anomalies: If the specific value within the dataset is anomalous with respect to the complete data then it is known as point anomalies.

Contextual Anomalies: If the occurrence of data is anomalous for specific circumstances, then it is known as contextual anomalies. For example, the anomaly occurs at a specific interval.

Collective Anomalies: If the collection of occurrence of data is anomalous with respect to the rest of dataset then it is known as collective anomalies. For example, breaking the trend observed in graph.

Machine learning techniques are more effective as compared with the statistical techniques to detect and analyze anomalies in time-series data. This is because machine learning has two important features, that is, feature engineering and prediction. The feature engineering aspect is used to address the trend and seasonality issues of time series data. The issues of fitting the model to time series data can also be resolved by it.

Deep learning is used to combine the feature extraction of time series with a non-linear autoregressive model for higher level prediction. Deep learning is used to extract useful information from the features automatically without using any human effort or complex statistical techniques.

There are two most effective techniques of machine learning, that is, supervised and unsupervised learning. Supervised learning is performed for training data points so that they can be classified into anomalous and non-anomalous data points. But, for supervised learning, there should be labeled anomalous data points. Another approach for detecting anomaly is unsupervised learning. One can apply unsupervised learning to train a system so that prediction of next data points in the series could be made. To implement this, a confidence interval or prediction error is made. Therefore, to detect anomalous data points, a test can be implemented to check which data points are present within or outside the confidence interval. The most common supervised learning algorithms are supervised neural networks, support vector machine learning, k-nearest neighbors, Bayesian networks and decision trees. The most common unsupervised algorithms are self-organizing maps (SOM), K-means, C-means, expectation-maximization meta-algorithm (EM), adaptive resonance theory (ART), and one-class support vector machine.

A recurrent neural network (RNN) is one of the deep learning algorithms for detecting anomalous data points within the time series. RNN includes an input layer, hidden layers, and an output layer. The nodes within the hidden layer are responsible for handling an internal state and memory. They both will be updated as the new input is fed into the network. The internal state of RNN is used to process the sequence of inputs. The important feature of memory is that it can automatically learn the time-dependent features.

Therefore, some embodiments of the present invention relate to processing of "log" data and/or log messages. A log message can include a set of log data that is configured to be written to a log (e.g., in a time-ordered and/or real-time manner). Log data can include multiple components that each correspond to a field. Log data can include one or more field tags that identify a field and/or one or more field values that include a value for a particular field. A log message can include, for example, a record from an event log, a transaction log, or a message log. In some instances, log data in each of one, more or all log messages represents an event (e.g., powering on or off of a device or component, a successful operation having been completed by a device or component, a failure of an operation having been initiated at a device or component, receiving a communication from a device or component, or transmitting a communication to a device or component). Log data can further identify, for example, a time stamp, one or more devices (e.g., by IP address) and/or one or more device or operation characteristics.

While the below description can describe embodiments by way of illustration with respect to "log" data, processing of other types of data are further contemplated. Therefore, embodiments are not to be limited in its application only to log data. In addition, the following description can also interchangeably refer to the data being processed as "records," "machine-generated data records," "log messages" or "messages," without intent to limit the scope of the invention to any particular format for the data. A machine-generated data record can include or can be, for example, a log message, an electronic file (e.g., a document, spreadsheet, or image file) and/or a communication (e.g., a post onto a website, short message service (SMS) message, or email).

A machine-generated data record can include machine-generated data, such as data generated by a server, security device, access control device, or computer. In some instances, a machine-generated data record is generated by a machine automatically (e.g., in response to an event, such as receipt of a communication, detecting a defined time or completion of a defined time interval, detecting satisfaction of a condition such as one that relates to data storage, sensor reading, and/or operation of a computer system). In some instances, a machine-generated data record is generated without relying on recent human input (e.g., local human input) to define what data is to be included and/or to trigger generation of and/or transmission of the machine-generated data record. A machine-generated data record can be represented in a log message in a machine-readable manner. A machine-generated data record can be human-readable. A machine-generated data record be structured, semi-structured or unstructured.

Referring back to FIG. 1, log data 102 is received from the system. The log data 102 are received by a log classification module 104, which classifies the log data 102. The classified log data is provided to a log augmentation module 106. Data augmentation adds value to base data by adding information derived from internal and external sources within an enterprise. Some techniques for data augmentation include:

An extrapolation technique, which is based on heuristics. In the extrapolation technique, the relevant fields are updated or provided with values.

A tagging technique, where common records are tagged to a group, making it easier to understand and differentiate for the group.

An aggregation technique, where mathematical values of averages and means are used, and values are estimated for relevant fields if needed.

A probability technique, which is based on heuristics and analytical statistics, where values are populated based on the probability of events.

Subsequently, the augmented logs are sent from the log augmentation module 106 to a short-term log repository 108. The augmented logs can also be provided to a log knowledge database 110, e.g., as future training data.

Then, data or history logs from the history log repository 120 can be processed. The data from the history log repository 120 can be fed into a log clustering module 122. A cluster is the collection of data objects which are similar to one another within the same group (class or category) and are different from the objects in the other clusters. Clustering is an unsupervised learning technique in which there are predefined classes and prior information, which defines how the data should be grouped or labeled into separate classes. Clustering allows a user to find hidden relationships between the data points in the dataset.

The clustered log data is then analyzed to determine whether such data includes normal patterns or abnormal patterns. For normal pattern identification, a log template mining module 124, a feature and variable value extraction and profiling module 128 are implemented. A normal pattern identification component 130 collects and stores all of the normal patterns identified. For abnormal pattern identification, a rare log identification module 126 is implemented. The abnormal pattern identification component 132 collects and stores all of the abnormal patterns identified. These can be referred to as candidate anomalies.

Thereafter, the normal pattern and the abnormal patterns are run through a subject matter expert (SME) validation module 134. SMEs collectively validate and enhance selected data elements. When an SME 134 receives a request, the SME 134 considers the data element associated with the data request. The SME 134 can make any revisions or corrections to the data that he or she determines to be necessary, based on the SME's familiarity with subject matter pertaining to the data. For example, if the data element included a ticket with blank items, the SME 134 can correctly fill in some or all of the blank items. If the data element pertained to the purpose for which a group of servers was being used, the SME 134 can recognize that some of the data stated such purpose incorrectly. The SME 134 can then revise the data to show the correct purpose of server use. The above actions of the SMEs 134 could eliminate some or all of the gaps in a data element, and could increase the confidence level thereof. Data quality is thereby significantly improved.

After the SMEs 134 validate the log data, the validated log data can be provided to a rule generator 136. The rule generator 136 automatically generates alerting rules 138 based on the history logs. The alerting rules 138 are automatically generated based on the normal pattern identification module 130 and the abnormal pattern identification module 132.

The rule generator 136 can be configured as a sniffer capable of monitoring and/or capturing inbound and/or outbound traffic with regard to resources of interest, to log respective communication events and to collect such log records during a certain substantial period of time and/or until obtaining a sufficient amount of data. Additionally or alternatively, the log records can be obtained by the rule generator 136 from an external sniffer and/or external database.

The log records are collected until a sufficient amount of log records are received, for example, by predefined/configurable threshold(s), predefined collection period, etc. The duration of the collection period depends on intensity of traffic between involved network resources (e.g. one month can be a reasonable default value for many organizations). Accuracy of the resulting operational rule-set generated in accordance with the gathered information increases with increasing the number of collected logs (and, accordingly, the duration of the collection period). The duration of the collection period can be configurable in accordance with a certain threshold. The threshold can be characterized, for example, by a total number of collected respective logs (e.g., 5 million logs); by a number of logs collected per certain service and/or destination/source addresses; by a total number of collected respective logs of some types of traffic (especially for rare traffic, e.g. a backup restore service); by a total number of collected respective logs and relationship thereof of different types of traffic (e.g., 5% of certain traffic among not less than 1 million collected log records); by total number of collected logs in relation to traffic per pre-configured rule-set, etc.

The rule generator 136 further automatically generates an initial permissive rule that corresponds, e.g., to an address space covering respective log records, such address space referred to hereinafter as a log-defined address space. Accordingly, the permissive rule can cover "Any Source," "Any Destination," where the source and destination addresses belong to the respective log-defined address space. Optionally, the initial permissive rule can be configured to cover only a selected subset of the collected log records, for example group of log records corresponding to selected service (and/or other log fields if used for grouping).

Alerts can suitably be defined as follows: a non-actionable alert where an alert for which the system administrator does not need to take any action, a real alert where the alert requires the system administrator to take action to fix the corresponding issue, an alert duration where the length of time from an alert creation to its clearing exceeds a threshold, a transient alert where the alert is automatically cleared before the technician opens its corresponding ticket, an event alert where the notification of the alert is transmitted to an enterprise console, and a non-actionable ticket where the ticket was created from a non-actionable alert.

The alerting rules 138 are evaluated or assessed by an alerting engine 140. The alerting rules 138 can then be provided to the short-term log repository 108 if approved by the alerting engine 140. The alerting rules 138 can further be provided to the log knowledge database 110, as e.g., training data. The alerting rules 138 can be referred to as candidate alerting rules 138 that are automatically generated by analyzing the history logs stores in the history log repository 120. These candidate alerting rules 138 are assessed by the alerting engine 140. The alerting engine 140 can determine whether such automatically generated alerting rules are maintained or discarded.

In conclusion, the exemplary embodiments of the present invention introduce a cognitive based method to generate log alerting rule candidates automatically by analyzing the history logs. The exemplary methods include offline analytic steps to find the abnormal and normal patterns from history logs based on machine learning, statistical analysis and deep learning and steps to generate the alerting rules based on two principles, that is, if a normal pattern found in history log is broken or abnormal pattern is found, an alert can be fired or triggered. The exemplary methods also include online log augment steps to extract the valuable information from the log message, where this information can be consumed by the alerting engine to enforce the alerting rules generated by the offline steps.

Figure 2:
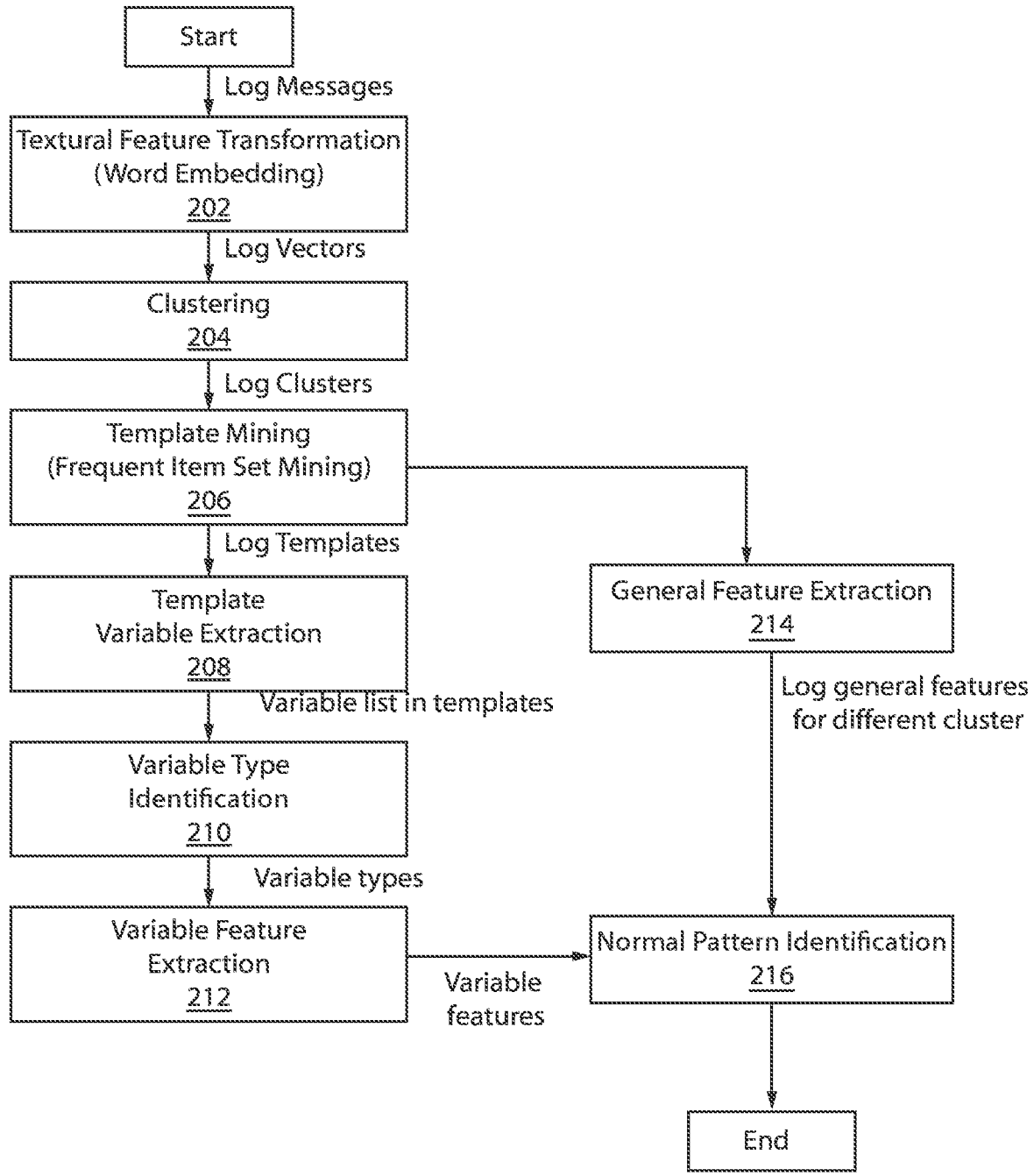
FIG. 2 is a block/flow diagram of an exemplary method for generating alerting rules based on normal pattern identification, in accordance with an embodiment of the present invention.

FIG. 2 is a block/flow diagram of an exemplary method for generating alerting rules based on normal pattern identification, in accordance with an embodiment of the present invention.

At block 202, the log messages go through textual feature transformation to create log vectors.

At block 204, the log vectors are clustered into a plurality of clusters.

At block 206, template mining takes place. This involves automatically extracting "templates" from collections of log records and portraying these in, e.g., a control flow graph (CFG), which would better facilitate template-level analysis, navigation, and exploration. From the CFG, anomalous run-time behavior can be more easily visualized and un-optimized code paths become apparent and can be used for code refactoring. Other benefits of log reduction via template mining include compact visualization and higher-order trend analysis.

At block 208, template variable extraction is performed. The template can include a variable list. Each variable V within the list can include a name, a description, a data type, a default value, and data integrity constraints. In embodiments, the name is a string that must be unique for all variables within list. The description is a free text field which describes the semantics of the variable. The default value is a value provided by default if the user does not provide any value for the variable. In embodiments, the default value has to be a valid value for the corresponding data type.

At block 210, the variable types are identified.

At block 212, the feature extraction is performed on the different variable types.

At block 214, a general feature extraction is performed from the template mining 206. The general features for different clusters of logs are determined.

At block 216, normal pattern identification is performed by receiving the variable features from the variable feature extraction block 212 and by receiving the general features for different clusters of logs from the general feature extraction at block 214.

Figure 3:
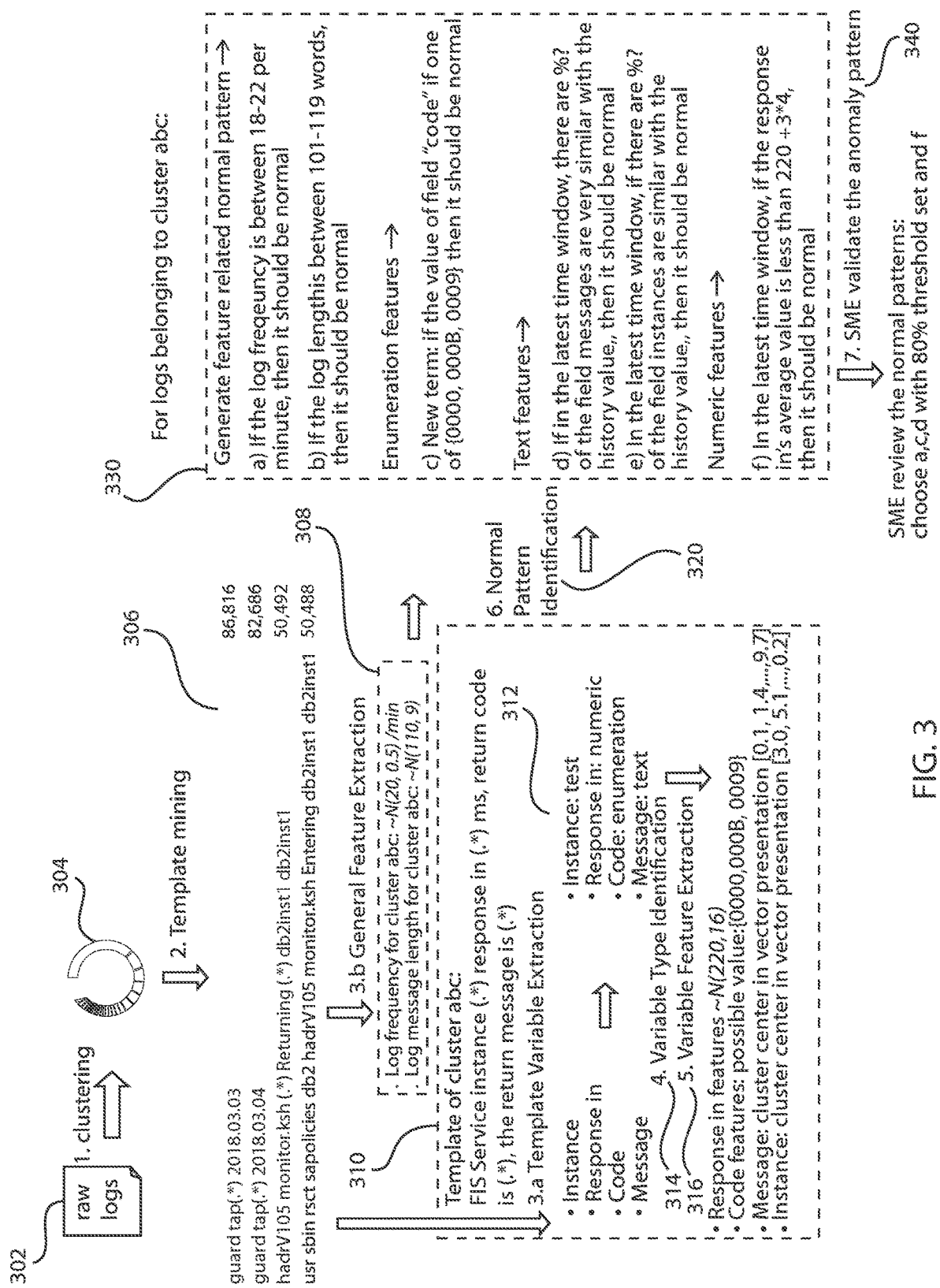
FIG. 3 is a block/flow diagram of an exemplary log normal pattern identification, in accordance with an embodiment of the present invention.

FIG. 3 is a block/flow diagram of an exemplary log normal pattern identification, in accordance with an embodiment of the present invention.

In one example of normal pattern identification, raw logs 302 are received and are clustered into a plurality of clusters. Template mining 304 is performed on the plurality of clusters. The template mining results in data structures 306. The data structures 306 go through general feature extraction 308. The feature extraction can include, e.g., log frequency and log message length. The template 310 of the cluster "abc" includes template variable extraction data 312, a variable type identification 314, and a variable feature extraction 316. Normal pattern identification 320 has been identified. As such, for logs belongs to cluster "abc" information 330 can be determined.

The information 330 includes generating feature related normal patterns if the log frequency is between 18 and 22 minutes and if the log length is between 101 and 119 words. Under such circumstances, the a normal pattern is detected within the log data. The information 330 further includes enumeration features, text features, and numeric features. Then the SME validation 340 is performed to validate normal patterns and abnormal patterns.

Of course, this is just one illustrative example for normal pattern identification. One skilled in the art can contemplate a plurality of other different normal pattern identification methodologies.

Figure 4:
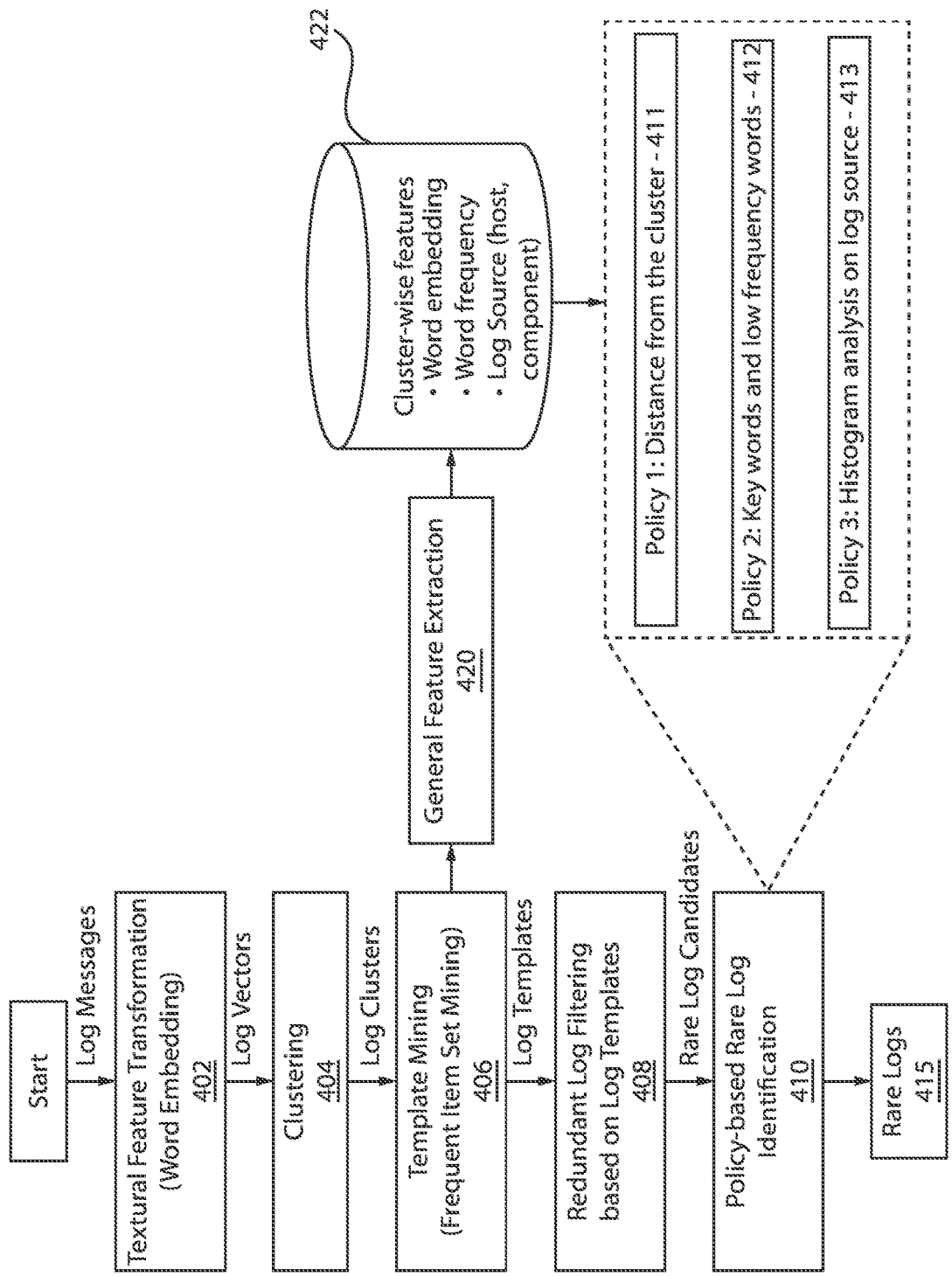
FIG. 4 is a block/flow diagram of an exemplary method for generating alerting rules based on abnormal pattern identification, in accordance with an embodiment of the present invention.

FIG. 4 is a block/flow diagram of an exemplary method for generating alerting rules based on abnormal pattern identification, in accordance with an embodiment of the present invention.

At block 402, the log messages go through textual feature transformation to create log vectors.

At block 404, the log vectors are clustered into a plurality of clusters.

At block 406, template mining takes place.

At block 408, the log templates go through log filtering to determine, e.g., redundant logs. Rare log candidates can be identified. In other words, such logs have been flagged for further evaluation based on policies described below.

At block 410, policy-based rare log identification occurs for the rare log candidates. The rare log candidates are evaluated in view of the predetermined policies for potential violations.

At block 415, the rare logs are identified (based on which ones violate predetermined policies). The polices can be determined based on a log knowledge database formed by training data. The training data can be assembled by machine learning, statistical analysis and deep learning techniques. The training data can be continuously updated in real-time.

At block 420, general feature extraction takes place from the template mining at block 406.

At block 422, the features of the clusters are determined.

The policies of the logs are predetermined or pre-established. A first policy 411 can be related to a distance from the cluster, a second policy 412 can be related to key words and low frequency words, and a third policy 413 can be related to histogram analysis on log source. One skilled in the art can contemplate a plurality of other different policies based on a number of variables/parameters. The rare log candidates are thus evaluated in view of the predetermined policies. If the rare log candidates violate one or more of the policies, then they are designated as rare logs 415. If they do not violate any of the predetermined polices, then the rare log candidates can have their designation changed to normal logs. The designation change can occur automatically without user intervention.

Figure 5:
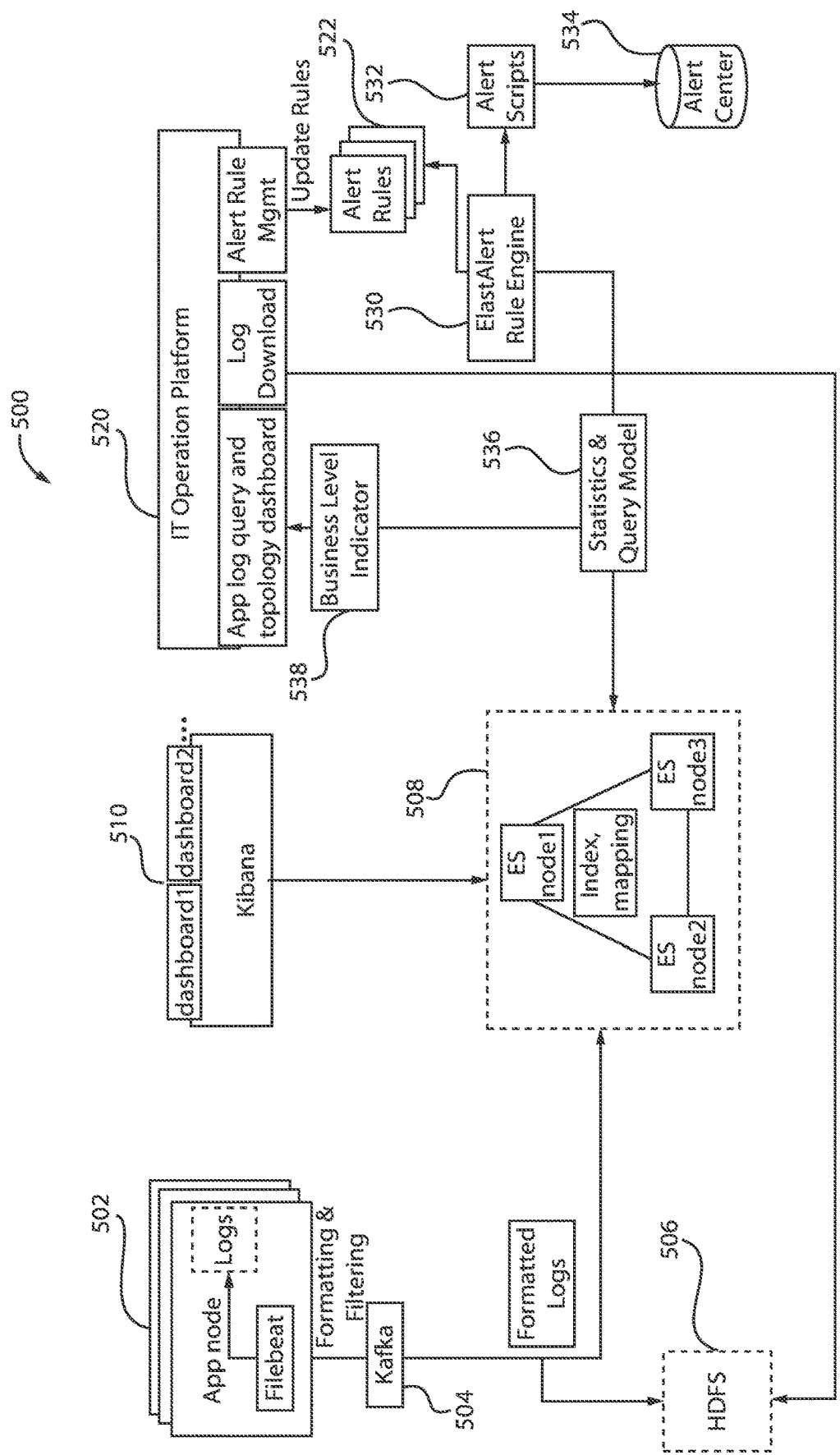
FIG. 5 is a block/flow diagram of an exemplary application log aggregation and alerting system.

FIG. 5 is a block/flow diagram of an exemplary application log aggregation and alerting system 500.

The system 500 includes application nodes 502 that generate logs. The logs are formatted and filtered. The processed logs are then provided to a stream processing software platform 504. This can be an open source streaming platform, such as Apache Kafka®. Kafka® aims to provide a unified, high-throughput, low-latency platform for handling real-time data feeds.

The formatted logs are then provided to a Hadoop Distributed File System (HDFS) architecture 506. HDFS 506 is a distributed file system designed to run on commodity hardware. HDFS 506 has many similarities with existing distributed file systems. However, the differences from other distributed file systems are significant. HDFS is highly fault-tolerant and is designed to be deployed on low-cost hardware. HDFS provides high throughput access to application data and is suitable for applications that have large data sets.

The formatted logs are also provided to a log aggregator 508 where the logs are clustered. The cluster of logs can be stored in a search server. One such search server can be, e.g., an elasticsearch cluster. Elasticsearch is an open source search server that is used for real-time distributed search and analysis of data. Elasticsearch is a search engine.

The log aggregator 508 also receives support from Kibana 510. Kibana is an open source data visualization plugin for Elasticsearch. Kibana 510 provides visualization capabilities on top of the content indexed on an Elasticsearch cluster. Thus, the formatted logs received in the search engine (Elasticsearch) can be visualized by employing Kibana 510. Users can create bar, line and scatter plots, or pie charts and maps on top of large volumes of data with Kibana 510. As a result, the formatted log data can be easily visualized via visualization techniques provided by one or more visualization tools, such as Kibana 510.

So far, the system 500 has implemented log aggregation architecture. The system 500 can also provide for an alerting architecture. The alerting architecture can include an alert rule engine 530 that generates alert rules 522. The alert rule engine 530 also generates alert scripts 532 that are stored in an alert repository 534. The alert rules 522 can be continuously updated, in real-time, by an IT operations platform 520 employing an alert rule management component. The alert rule engine 530 can also provide the generated alerts to a statistics and query model 536 that communicates with the log aggregator 508. The statistics and query model 536 can send data to a business level indicator 538 that communicates with the IT operations platform 520.

As a result, the open source based log aggregation and alerting architecture 500 can be used in its entirety or in selective parts to support the alerting rule generation tool of FIG. 1. Moreover, in summary, offline analytics are employed to find the abnormal and normal patterns from history logs based on machine learning, statistical analysis and deep learning, the tool-specific alerting rules are generated based on the detected abnormal and normal patterns, and an online log augment method is employed to extract the valuable information from the log message, where this information can be consumed by the alerting tools to enforce the alerting rules. The exemplary embodiments thus pertain to automated discovery of alerting rules and to an alerting rule generation tool.

Figure 6:
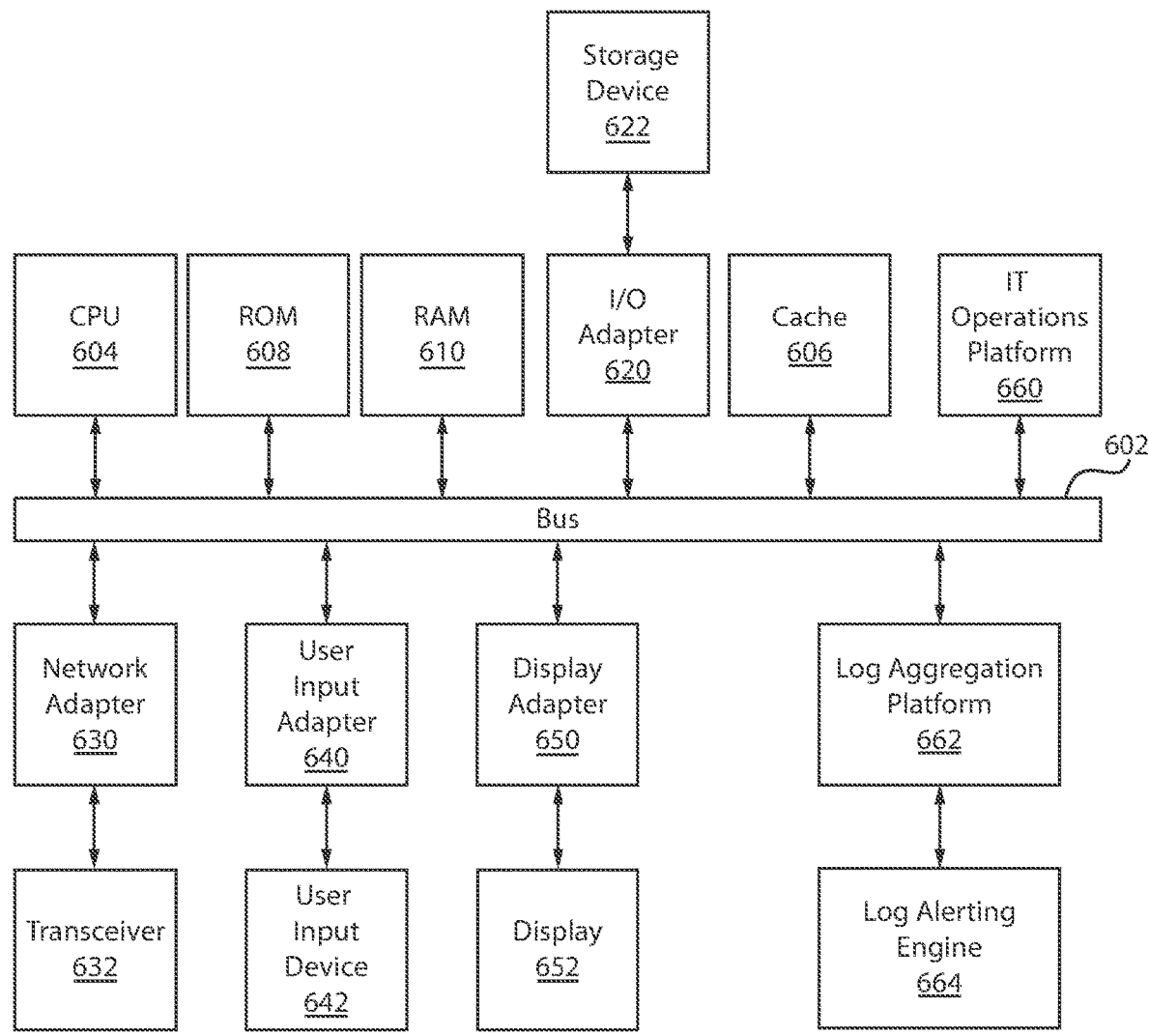
FIG. 6 is a block/flow diagram illustrating an example processing system for generating tool-specific alerting rules based on abnormal and normal patterns from history logs, in accordance with an embodiment of the present invention.

FIG. 6 is a block/flow diagram illustrating an example processing system for generating tool-specific alerting rules based on abnormal and normal patterns from history logs, in accordance with an embodiment of the present invention.

The processing system includes at least one processor (CPU) 604 operatively coupled to other components via a system bus 602. A cache 606, a Read Only Memory (ROM) 608, a Random Access Memory (RAM) 610, an input/output (I/O) adapter 620, a network adapter 630, a user interface adapter 640, and a display adapter 650, are operatively coupled to the system bus 602. Additionally, an IT operations platform 660 can communicate through the system bus 602. Moreover, the IT operations platform 660 can communicate with a log aggregation platform 662 and a log alerting engine 664.

A storage device 622 is operatively coupled to system bus 602 by the I/O adapter 620. The storage device 622 can be any of a disk storage device (e.g., a magnetic or optical disk storage device), a solid state magnetic device, and so forth.

A transceiver 632 is operatively coupled to system bus 602 by network adapter 630.

User input devices 642 are operatively coupled to system bus 602 by user interface adapter 640. The user input devices 642 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 642 can be the same type of user input device or different types of user input devices. The user input devices 642 are used to input and output information to and from the processing system.

A display device 652 is operatively coupled to system bus 602 by display adapter 650.

Of course, the processing system can also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 7:
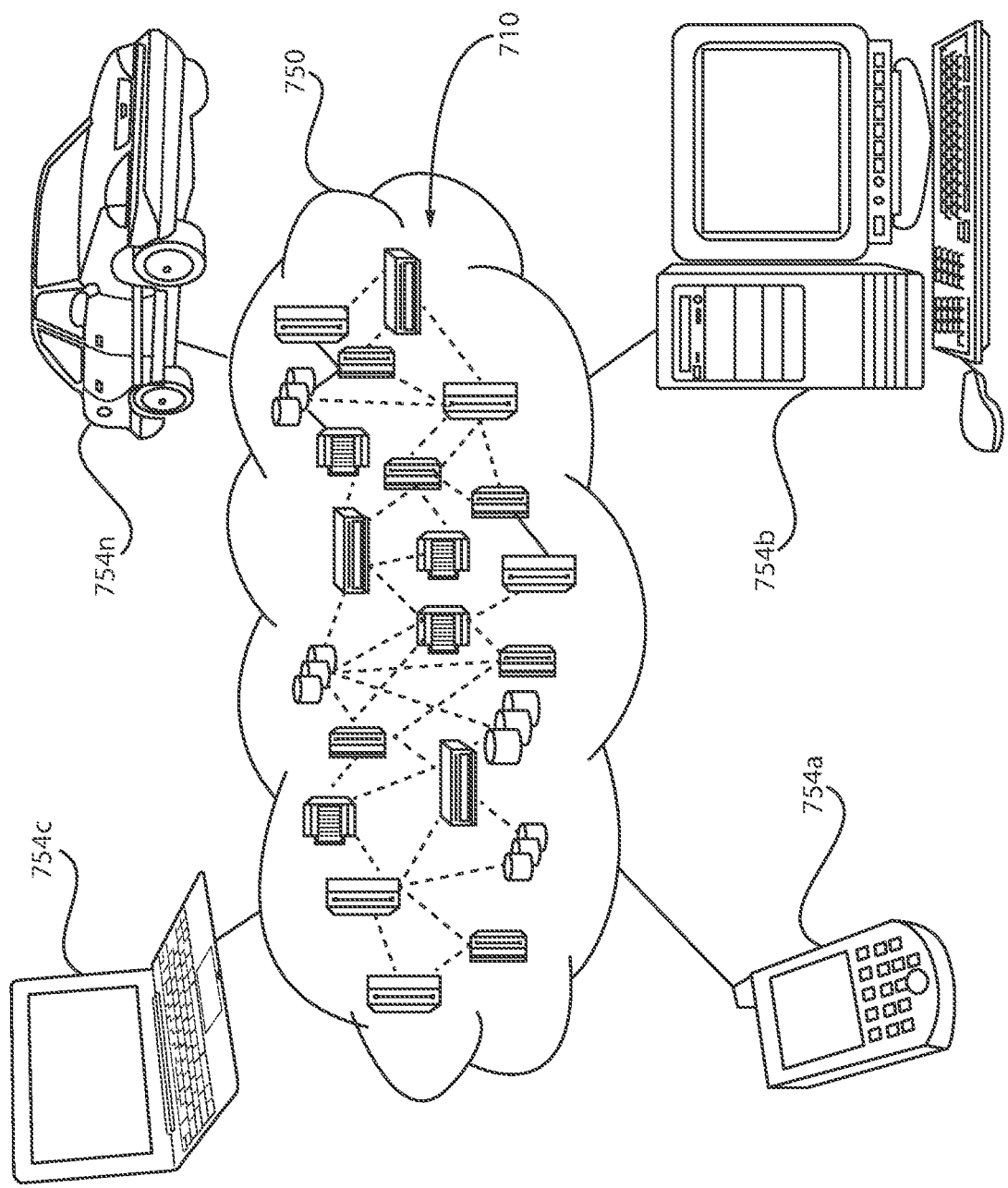
FIG. 7 is a block/flow diagram of an exemplary cloud computing environment, in accordance with an embodiment of the present invention.

FIG. 7 is a block/flow diagram of an exemplary cloud computing environment, in accordance with an embodiment of the present invention.

It is to be understood that although this invention includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, illustrative cloud computing environment 750 is depicted for enabling use cases of the present invention. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N can communicate. Nodes 710 can communicate with one another. They can be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
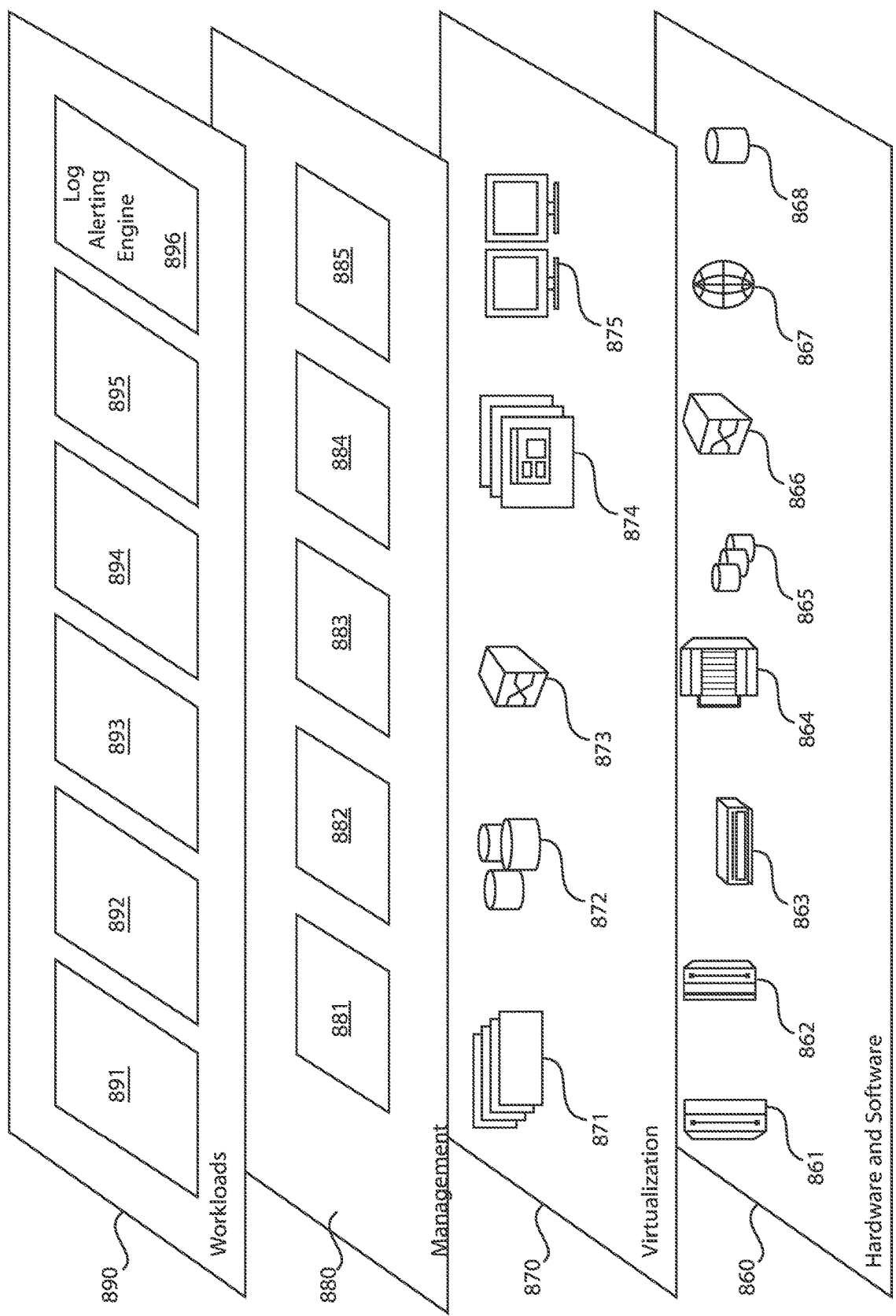
FIG. 8 is a schematic diagram of exemplary abstraction model layers, in accordance with an embodiment of the present invention.

FIG. 8 is a schematic diagram of exemplary abstraction model layers, in accordance with an embodiment of the present invention. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities can be provided: virtual servers 871; virtual storage 872; virtual networks 873, including virtual private networks; virtual applications and operating systems 874; and virtual clients 875.

In one example, management layer 880 can provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources can include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment can be utilized. Examples of workloads and functions which can be provided from this layer include: mapping and navigation 891; software development and lifecycle management 892; virtual classroom education delivery 893; data analytics processing 894; transaction processing 895; and a log alerting engine 896.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The present invention can be a system, a method, and/or a computer program product. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to at least one processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules. These computer readable program instructions can also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks or modules.

The computer readable program instructions can also be loaded onto a computer, other programmable data processing apparatus, or other device to cause a series of operational blocks/steps to be performed on the computer, other programmable apparatus or other device to produce a computer implemented process, such that the instructions which execute on the computer, other programmable apparatus, or other device implement the functions/acts specified in the flowchart and/or block diagram block or blocks or modules.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the blocks can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

Having described preferred embodiments of a system and method for generating log alerting rule candidates by analyzing history logs (which are intended to be illustrative and not limiting), it is noted that modifications and variations can be made by persons skilled in the art in light of the above teachings. It is therefore to be understood that changes may be made in the particular embodiments described which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method comprising:
collecting history logs until a collection threshold is met;
identifying, via offline analytics, abnormal patterns and normal patterns from the history logs based on machine learning, statistical analysis and deep learning, the history logs stored in a history log database;
feeding the abnormal patterns and the normal patterns to a subject matter expert (SME) validation module to make revisions or corrections to the abnormal patterns and the normal patterns;
automatically generating alerting rule candidates based on the identified abnormal and normal patterns detected in the history logs;
transmitting the alerting rule candidates to an alerting engine to assess whether the generated alerting rule candidates are accepted or discarded;
receiving a plurality of online log messages from a plurality of computing devices connected to a network;
augmenting the plurality of online log messages; and
extracting information from the plurality of augmented online log messages to be provided to the alerting engine, the alerting engine configured to approve and enforce the alerting rule candidates accepted by the alerting engine,
wherein the collection threshold is based on a total number of the history logs, a traffic type associated with each of the total number of the history logs, and a percentage of the total number of the history logs being of a certain traffic type.

2. The method of claim 1, wherein the history logs are clustered into a plurality of clusters and analyzed to determine normal logs and abnormal logs.

3. The method of claim 2, wherein rare logs are identified based on predetermined policies related to the abnormal logs.

4. The method of claim 2, wherein the normal logs are exposed to log template mining techniques to create log templates.

5. The method of claim 4, wherein variables are extracted from the log templates, the variables are identified by variable type, and feature extraction is performed on the variables.

6. The method of claim 1, wherein the corrections to the abnormal patterns and the normal patterns by the SME validation module include filling in blank items.

7. The method of claim 1, wherein the generated alerting rule candidates are provided to a knowledge database constructed from log message training data.

8. A non-transitory computer-readable storage medium comprising a computer-readable program executed on a processor in a data processing system, wherein the computer-readable program when executed on the processor causes a computer to perform the steps of:
collecting history logs until a collection threshold is met;
identifying, via offline analytics, abnormal patterns and normal patterns from the history logs based on machine learning, statistical analysis and deep learning, the history logs stored in a history log database;
feeding the abnormal patterns and the normal patterns to a subject matter expert (SME) validation module to make revisions or corrections to the abnormal patterns and the normal patterns;
automatically generating alerting rule candidates based on the identified abnormal and normal patterns detected in the history logs;
transmitting the alerting rule candidates to an alerting engine to assess whether the generated alerting rule candidates are accepted or discarded;
receiving a plurality of online log messages from a plurality of computing devices connected to a network;
augmenting the plurality of online log messages; and
extracting information from the plurality of augmented online log messages to be provided to the alerting engine, the alerting engine configured to approve and enforce the alerting rule candidates accepted by the alerting engine,
wherein the collection threshold is based on a total number of the history logs, a traffic type associated with each of the total number of the history logs, and a percentage of the total number of the history logs being of a certain traffic type.

9. The non-transitory computer-readable storage medium of claim 8, wherein the history logs are clustered into a plurality of clusters and analyzed to determine normal logs and abnormal logs.

10. The non-transitory computer-readable storage medium of claim 9, wherein rare logs are identified based on predetermined policies related to the abnormal logs.

11. The non-transitory computer-readable storage medium of claim 9, wherein the normal logs are exposed to log template mining techniques to create log templates.

12. The non-transitory computer-readable storage medium of claim 11, wherein variables are extracted from the log templates, the variables are identified by variable type, and feature extraction is performed on the variables.

13. The non-transitory computer-readable storage medium of claim 8, wherein the corrections to the abnormal patterns and the normal patterns by the SME validation module include filling in blank items.

14. The non-transitory computer-readable storage medium of claim 8, wherein the generated alerting rule candidates are provided to a knowledge database constructed from log message training data.

15. A system comprising:
a memory; and
one or more processors in communication with the memory configured to:
collect history logs until a collection threshold is met;
identify, via offline analytics, abnormal patterns and normal patterns from the history logs based on machine learning, statistical analysis and deep learning, the history logs stored in a history log database;
feed the abnormal patterns and the normal patterns to a subject matter expert (SME) validation module to make revisions or corrections to the abnormal patterns and the normal patterns;
automatically generate alerting rule candidates based on the identified abnormal and normal patterns detected in the history logs;
transmit the alerting rule candidates to an alerting engine to assess whether the generated alerting rule candidates are accepted or discarded;

receive a plurality of online log messages from a plurality of computing devices connected to a network;

augment the plurality of online log messages; and extract information from the plurality of augmented online log messages to be provided to the alerting engine, the alerting engine configured to approve and enforce the alerting rule candidates accepted by the alerting engine, wherein the collection threshold is based on a total number of the history logs, a traffic type associated with each of the total number of the history logs, and a percentage of the total number of the history logs being of a certain traffic type.

16. The system of claim 15, wherein the history logs are clustered into a plurality of clusters and analyzed to determine normal logs and abnormal logs.

17. The system of claim 16, wherein rare logs are identified based on predetermined policies related to the abnormal logs.

18. The system of claim 16, wherein the normal logs are exposed to log template mining techniques to create log templates.

19. The system of claim 18, wherein variables are extracted from the log templates, the variables are identified by variable type, and feature extraction is performed on the variables.

20. The system of claim 15, wherein the corrections to the abnormal patterns and the normal patterns by the SME validation module include filling in blank items.

* * * * *